US006312491B2

(12) United States Patent
Coulonvaux

(10) Patent No.: US 6,312,491 B2
(45) Date of Patent: *Nov. 6, 2001

(54) CYLINDRICAL AIR FILTER WITH RADIALLY DIRECTED SEAL AND METHOD OF MANUFACTURING A HOUSING FOR SAME

(75) Inventor: Paul R. Coulonvaux, Brussels (BE)

(73) Assignee: Donaldson Company, Inc., Minneapolis, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/756,258

(22) Filed: Jan. 8, 2001

Related U.S. Application Data

(63) Continuation of application No. 09/178,661, filed on Oct. 26, 1998, now Pat. No. 6,187,240, which is a continuation of application No. 08/878,399, filed on Jun. 18, 1997, now Pat. No. 5,863,313, which is a continuation of application No. 08/675,081, filed on Jul. 3, 1996, now Pat. No. 5,693,109, which is a continuation of application No. 08/189,890, filed on Jan. 21, 1994, now Pat. No. 5,547,480.

(51) Int. Cl.[7] .................................................. B01D 35/30
(52) U.S. Cl. ................................ 55/498; 55/502; 55/510; 55/DIG. 5; 264/249; 264/DIG. 48
(58) Field of Search ...................... 55/495, 502, 497–499, 55/510, 507, DIG. 5; 264/249, DIG. 48; 210/493.1, 493.2, 493.5, 497.01

(56) References Cited

U.S. PATENT DOCUMENTS

| 3,078,650 | 2/1963 | Anderson et al. ...................... 55/337 |
| 3,423,909 | 1/1969 | Bennett et al. ...................... 55/510 X |
| 4,130,405 | 12/1978 | Akado et al. ....................... 55/510 X |
| 4,157,902 | 6/1979 | Tokar ................................. 55/502 X |
| 4,312,651 | 1/1982 | Esaki et al. ............................ 55/502 |
| 4,349,363 | 9/1982 | Patel et al. ..................... 210/493.2 X |
| 4,350,509 | 9/1982 | Alseth et al. ....................... 55/510 X |
| 4,488,889 | 12/1984 | McCarroll ............................... 55/502 |
| 4,720,292 | 1/1988 | Engel et al. ........................ 55/502 X |

(List continued on next page.)

FOREIGN PATENT DOCUMENTS

| 1 894 506 | 6/1964 | (DE) . |
| 81 24 893 | 4/1982 | (DE) . |
| 89 09 601 | 1/1991 | (DE) . |
| 0 423 435 A1 | 4/1991 | (EP) . |
| 0 426 064 A2 | 5/1991 | (EP) . |
| 0 470 330 A1 | 2/1992 | (EP) . |
| 0 559 011 | 9/1993 | (EP) . |
| 2 255 933 | 7/1975 | (FR) . |
| 1 511 904 | 5/1978 | (GB) . |
| 1 563 649 | 3/1980 | (GB) . |

OTHER PUBLICATIONS

*Applicant's Parent Cases.*

Primary Examiner—Richard L. Chiesa
(74) Attorney, Agent, or Firm—Merchant & Gould P.C.

(57) ABSTRACT

An air filter has a tubular metal housing with an air inlet and a plastic end cap affixed to one end of the housing. The opposite end of the housing is enclosed by a removable cover. The plastic end cap has an integral cylindrical air outlet with a portion thereof extending into the tubular housing. A generally cylindrical air filter element includes an inner liner, an outer liner, filter media captured therebetween, a closed end and an open end. The open end of the filter element has an end cap formed of an elastomeric material with an opening defined by a generally cylindrical radially inward-facing surface. The diameter of the opening is smaller than the outside diameter of that portion of the outlet member of the end cap that extends into the housing. The filter element is mounted on that portion of the outlet member extending into the tubular housing and the elastomeric material provides a seal.

16 Claims, 2 Drawing Sheets

U.S. PATENT DOCUMENTS

| | | |
|---|---|---|
| 4,759,783 | 7/1988 | Machado .................................. 55/498 |
| 4,838,901 | 6/1989 | Schmidt et al. .................... 55/502 X |
| 5,071,456 | 12/1991 | Binder et al. ....................... 55/510 X |
| 5,118,417 | 6/1992 | Deibel ................................. 55/510 X |
| 5,167,683 | 12/1992 | Behrendt et al. ................... 55/502 X |
| 5,547,480 | * 8/1996 | Coulonvaux ............................ 55/498 |
| 5,693,109 | * 12/1997 | Coulonvaux ............................ 55/498 |
| 5,863,313 | * 1/1999 | Coulonvaux ............................ 55/498 |
| 6,187,240 | * 2/2001 | Coulonvaux .......................... 264/249 |

* cited by examiner

US 6,312,491 B2

CYLINDRICAL AIR FILTER WITH RADIALLY DIRECTED SEAL AND METHOD OF MANUFACTURING A HOUSING FOR SAME

This application is a continuation of application Ser. No. 09/178,661, filed Oct. 26, 1998, and issued as U.S. Pat. No. 6,187,240. Application Ser. No. 09/178,661 is a continuation of 08/878,399, filed Jun. 18, 1997, and issued as U.S. Pat. No. 5,863,313. Application Ser. No. 08/878,399 is a continuation of application Ser. No. 08/675,081, filed Jul. 3, 1996, and issued as U.S. Pat. No. 5,693,109; application 08/675,081 is a continuation of application 08/189,890, filed Jan. 21, 1994 and issued as U.S. Pat. No. 5,547,480. The disclosures of 09/178,661; 08/878,399; 08/675,081; and 08/189,890 are incorporated herein by reference.

BACKGROUND OF THE INVENTION

The present invention relates generally to air cleaners or air filters and more specifically to air cleaners with cylindrical pleated paper filter elements which are used primarily on the over-the-road trucks and agricultural vehicles. Such applications generally are severe filtering environments.

U.S. Pat. No. 3,078,650 shows one prior art structure of air cleaner of this type. The air cleaner has a tubular metal housing with an inlet for dust laden air. A cylindrical pleated paper filter element is mounted within the housing. A clean air outlet communicates with the interior of the pleated paper filter element. A seal must be provided between the pleated paper element and the outlet so that the dust laden inlet air will be forced through the pleated paper media of the filter whereby particulates are removed from the air flow before it exits from the filter. In the '650 patent the seal between the filter element and the outlet is provided by a gasket secured to the filter element. The gasket engages an end wall of the tubular housing with the filter element held in place by a yoke and associated bolt and nut assembly.

U.S. Pat. No. 4,720,292 discloses another prior art structure for a cylindrical air filter of the type of the present invention. In its preferred embodiment, the housing of the '292 air filter is formed of a plastic material. A cylindrical pleated paper filter element is mounted within the housing. The pleated paper element has an open end for fluid communication with the air outlet. The open end of the filter element has a ring like end cap that is preferably made from an elastomer such as urethane foam which has a relatively soft, rubber-like consistency. The air filter element is mounted on the air outlet tube, and a seal is provided by engagement of the end cap with the tubular outlet member.

In order to manufacture an air filter using a plastic housing, a mold for the housing is typically needed. A separate mold would typically be used for housings that vary in size as well as variations in location of the air inlet. The tooling for molds for each possible application of the air filter can be quite expensive.

SUMMARY OF THE INVENTION

The air cleaner of the present invention incorporates a tubular housing with an open end and an air inlet. An end cap is affixed to and encloses the open end of the tubular housing. The end cap has a generally cylindrical portion extending into the interior of the tubular housing. The filter element is generally cylindrical with an inner liner, outer liner and filter medium sandwiched there between. The filter element has an end cap formed of elastomeric material. The end cap has an opening into the interior of the filter element. The opening is defined by a generally cylindrical radially inward-facing surface with the opening having a diameter that is smaller than the outside diameter of the portion of the end cap that extends into the housing. The filter element is attached to the end cap by inserting the outlet portion of the end cap into the opening defined in the end cap of the filter element. The end cap of the filter element and the outlet portion of the end cap affixed to the housing provide a seal. A cover is removably mounted to enclose the second end of the tubular housing.

In the preferred embodiment the tubular housing is formed of a suitable metal material and the end cap is a molded plastic. The metal housing is provided with a plurality of engagement members positioned about its first end and projecting inwardly. The plastic end cap has a plurality of recesses formed therein which are adapted to receive the engagement members to affix the end cap to the housing.

The present invention also relates to a method of manufacturing the housing of the preferred embodiment of the invention. It includes the steps of forming a tubular housing from a metal material with the tubular housing having first and second open ends and an air inlet. A plastic end cap is molded with an integral air outlet and a plurality of recesses in its outer circumference. The end cap is then inserted into one end of the metal housing. Engagement members are formed in the tubular housing to project inward into the recesses in the plastic end cap to affix the end cap to the housing.

Thus, in its preferred embodiment the present invention provides the advantages of a metal housing for air filters particularly designed for rugged environments and a filter element seal structure eliminating the mechanical arrangement such as that shown in the '650 patent described above. These and other advantages of the present invention will become apparent with reference to the accompanying drawings, detailed description of the preferred embodiment, and claims.

DESCRIPTION OF THE PREFERRED EMBODIMENT

Figure 1:
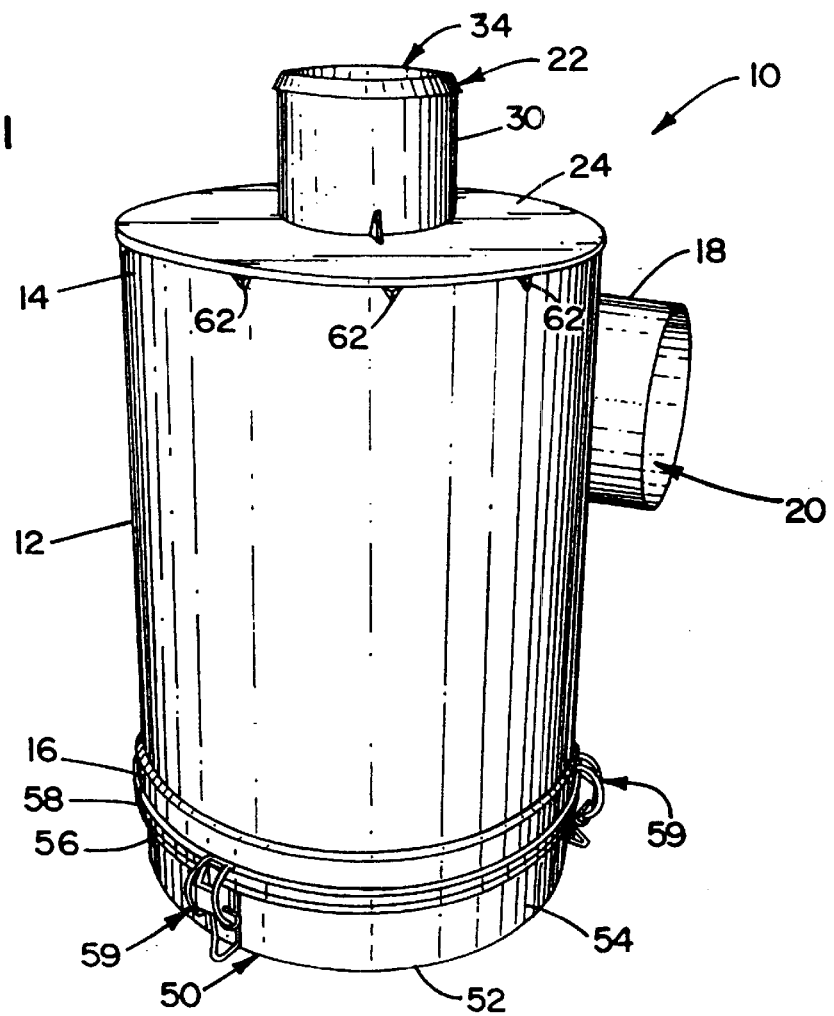
FIG. 1 is a view in perspective of the air filter of the present invention.

Referring to the drawings wherein like numerals represent like parts throughout several views, there is disclosed in FIG. 1 an air cleaner or filter 10. Air cleaner 10 is a generally tubular housing 12 with a first end 14 and a second end 16. In the preferred embodiment housing 12 is formed of a suitable metal material. Housing 12 has an air inlet 18 defining an opening 20 for the introduction of particulate laden air into filter 10. An end cap 22 is affixed to housing 12 at first end 14 to enclose first end 14 as will be described in more detail hereafter. End cap 22 is a generally planar circular base member 24 with an integral ring member 26 disposed at its outer circumference and enclosed within housing 12. A second ring member 28 is also formed integrally with base member 24 and positioned within housing 12. Ring members 26 and 28 are concentrically disposed with respect to each other. Also integrally formed with base member 24 is an air outlet 30 extending above the exterior surface of end cap 22. Air outlet has a tubular portion 32 extending into the interior of housing 12. Air outlet 30 defines an opening at 34 through which filtered air exits from air filter 10.

Disposed within housing 12 is an air filter element 36. Air filter element 36 is of the type disclosed in U.S. Pat. No. 4,720,292, the disclosure of which is incorporated herein by reference. It is a cylindrical element having a cylindrical liner 38 and a cylindrical outer liner 40, both constructed from perforated metal. A cylindrical pleated paper filter element 42 is mounted between liners 38 and 40. Element 36 has a closed end 44 in the form of a circular cap of urethane foam material molded thereon and having a relatively soft, rubber-like consistency. Closed end 44 is molded over and holds together the ends of liners 38 and 40 and filter element 42 and extends across the end of filter element 36 to provide a closed end.

Air filter element 36 has an open end disposed adjacent end cap 22. A ring-like end cap 46 is molded over the ends of liners 38, 36 and pleated paper filter element 42. End cap 46 is preferably made from an elastomeric material such as urethane foam material having a relatively soft, rubber-like consistency so that it is capable of functioning as a seal or gasket material. End cap 46 has a radially inward facing surface 48 adapted to engage the outer surface of tubular portion 32 of air outlet 30. Surface 48 defines a generally cylindrical opening with an inner diameter which is slightly smaller than the outside diameter of tubular portion 32. Thus, the elastomeric material of end cap 46 is compressed at surface 48 to provide a positive air seal between end cap 46 and air outlet 30. The open end of air filter element 36 is also captured between tubular portion 32 and second ring member 28 to properly position air filter element 36 within housing 12.

Second end 16 of housing 12 is enclosed by a cover 50 which is removably mounted to housing 12. Cover 50 has an end member 52 and a side wall 54. Extending around side wall 54 is a ledge member 56. At second end 16 of housing 12, a flange portion 58 is provided which is received on ledge member 56. Cover 50 has a plurality of spring-loaded clamps 59, the structure of which is well known in the prior art, which engage flange portion 58 to secure cover 50 thereto. End member 52 of cover 50 engages the closed end 44 of air filter element 36. Cover 50 may also be provided with a particulate collection trap (not shown).

Figure 3:
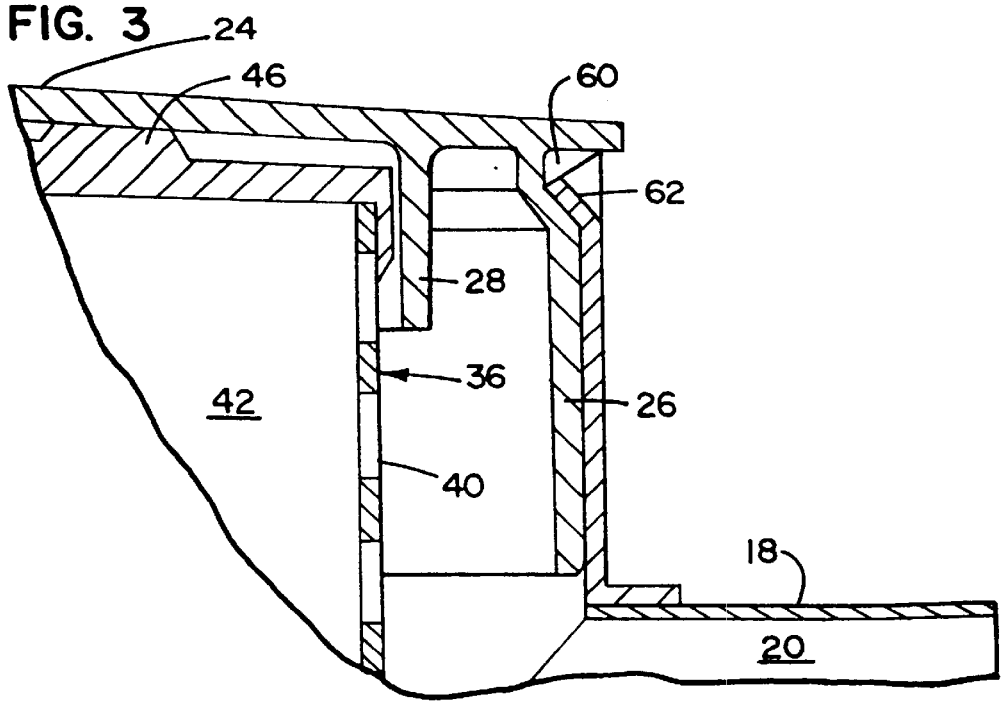
FIG. 3 is an enlarged fragmentary view in section illustrating the attachment of the end cap to the housing of the air filter of the present invention.
Figure 2:
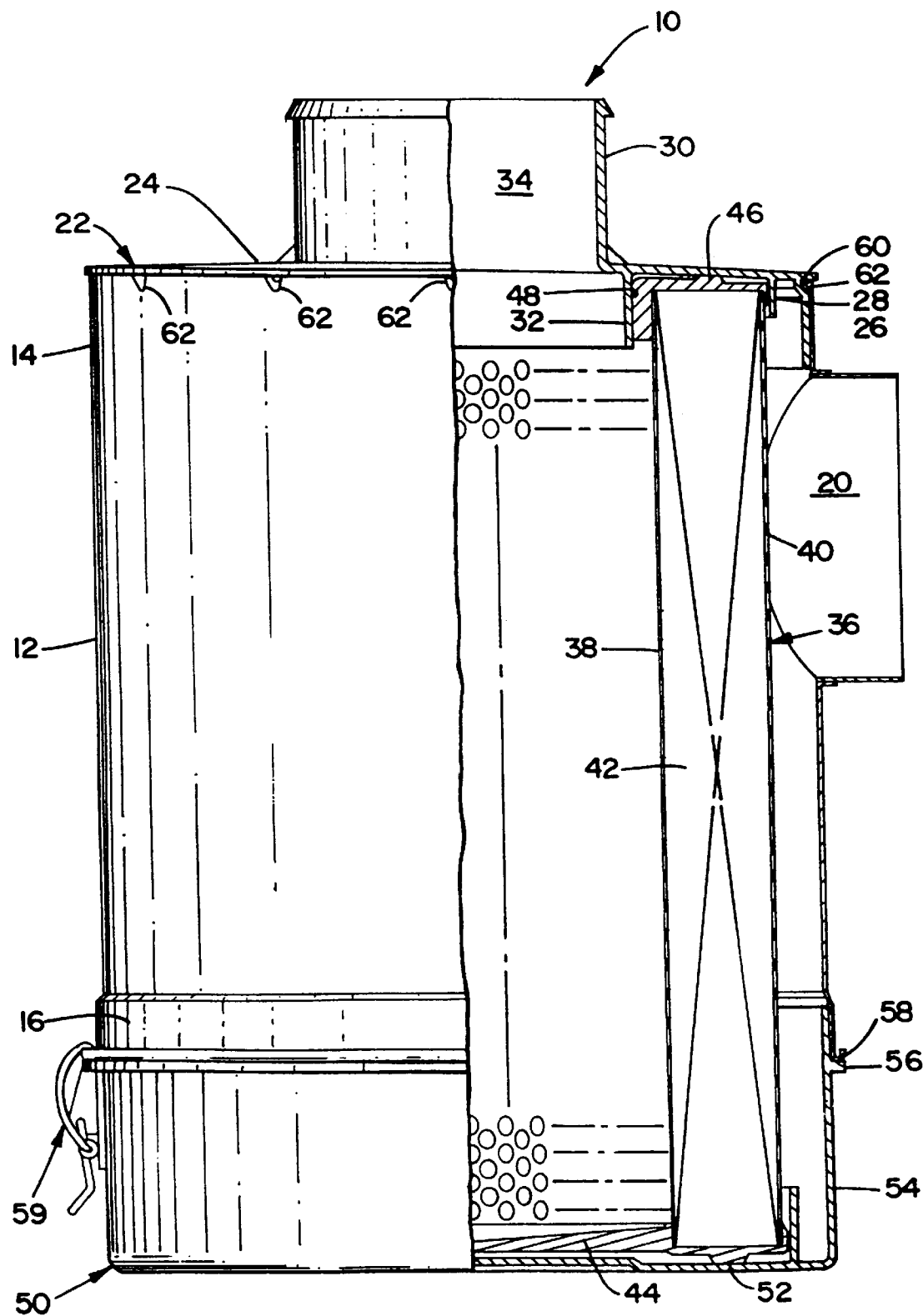
FIG. 2 is an elevational view in partial section with portions removed.

As shown in more detail in FIGS. 2 and 3, ring member 26 of end cap 22 provided with a plurality of recesses 60 spaced about its circumference. At it first end 14, housing 12 has a plurality of inwardly projecting 20 members 62 that mate with and are received within recesses 60 to affix end cap 22 to housing 12. As previously described, in the preferred embodiment end cap 22 is formed of a plastic material, such as polypropylene, while housing 12 is constructed of metal. Removable cover 50 may be either plastic or metal. Housing 12 and end cap 22 are constructed in the following manner. Metal housing 12 is made in accordance with well known prior art processes to the appropriate length and with air inlet 18 disposed at the desired location. End cap 22 is molded from a plastic material according to well known molding processes. End cap 22 is placed on first end 14 of housing 12 in a snap-fit frictional engagement. Housing 12 is stamped or indented inward about first end 14 at locations. corresponding to recesses 60 in ring member 26. This metal stamping operation forms inward projections 62 that are received in recesses 62 to affix end cap 22 to housing 12. Air filter 10 is further assembled by installing air filter element 36 within housing 12 and attaching cover 50.

From the above description, it can be seen that the present invention in its preferred embodiment incorporates the advantageous seal structure of the '292 patent. The housing can be made according to various design specifications by a metal forming process eliminating the need and expense of designing a plastic mold for each filter configuration. Moreover, the seal arrangement eliminates the mechanical structure used in air cleaners of the type shown in the U.S. Pat. 3,078,650.

Although a preferred embodiment of the invention has been disclosed, it should be understood that the same is capable of modification without departure from the scope and spirit of the invention as defined in the following claims.

What is claimed is:

1. An air cleaner comprising:
   (a) a metal housing including an air inlet tube, the metal housing defining a central interior region and having an open first end and an open second end; and,
   (b) a first molded plastic end cap positioned in covering relation on a first end of the tubular metal housing;
      (i) the first molded plastic end cap including:
         (A) an air outlet tube projecting outwardly from an exterior surface of the molded plastic end cap;
         (B) an inner tubular portion extending into the housing central region and defining an outlet tube for air flow outwardly from the metal housing central region; and,
         (C) a first ring member disposed along an outer circumferential region of the molded plastic end cap and projecting into the central region of the air cleaner;
   (c) the first molded plastic end cap being secured to the metal housing by a securing arrangement comprising a frictional engagement.

2. An air cleaner according to claim 1 wherein:
   (a) the securing arrangement includes engagement between a portion of the metal housing and a portion of the first ring member.

3. An air cleaner according to claim 2 wherein:
   (a) the frictional engagement includes at least one projection on the metal housing engaging a portion of the first molded plastic end cap.

4. An air cleaner according to claim 3 wherein:
   (a) the frictional engagement includes a plurality of projections on the metal housing engaging a portion of the first molded plastic end cap.

5. An air cleaner according to claim 3 wherein:
   (a) the frictional engagement includes at least one projection on the metal housing engaging at least one recess in the first molded plastic end cap.

6. An air cleaner according to claim 5 wherein:
   (a) the frictional engagement includes a plurality of projections on the metal housing engaging a plurality of recesses in the first molded plastic end cap.

7. An air cleaner according to claim 2 wherein:
   (a) the first molded plastic end cap includes a second ring member projecting into the metal housing central region; the second ring member being oriented between the inner tubular portion and the first ring member.

8. An air cleaner according to claim 7 including:
   (a) a cover removably secured over the open second end of the metal housing.

9. An air cleaner according to claim 8 wherein:
(a) the cover removeably secured over the open second end comprises plastic.

10. An air cleaner according to claim 9 wherein:
(a) the cover removeably secured over the open second end is secured on the metal housing by a plurality of clamps.

11. An air cleaner according to claim 7 including:
(a) a filter element removeably mounted in the metal housing central region.

12. An air cleaner according to claim 11 wherein:
(a) the filter element is a cylindrical element sealed to the inner tubular portion of the first molded plastic end cap.

13. An air cleaner according to claim 12 wherein:
(a) the filter element is positioned in the air cleaner with:
    (i) the inner tubular portion of the first molded end cap extending into an interior of the cylindrical element; and,
    (ii) the second ring member of the first molded end cap circumscribing an end of the filter element.

14. A method of assembling an air cleaner, including a step of:
(a) securing a molded plastic end cap to a metal housing sidewall by an attachment step comprising a friction fit engagement between the metal housing sidewall and the molded plastic end cap;
    (i) the molded plastic end cap having: an exterior surface with an air outlet tube projecting outwardly therefrom; an inner surface portion with an inner tubular air flow tube projecting therefrom; and, a first ring member extending from the inner surface of the molded plastic end cover and circumscribing the inner tubular air flow tube;
    (ii) the step of securing including:
        (A) orienting the molded plastic end cap with the inner tubular air flow tube and the first ring member projecting into an interior defined by the metal housing sidewall.

15. A method according to claim 14 wherein:
(a) said step of securing by an attachment step comprising friction fit engagement includes providing a projection on the metal housing to engage a portion of the first ring member on the molded plastic end cap.

16. A method according to claim 15 wherein:
(a) said step of securing includes providing a plurality of projections on the metal housing in engagement with a plurality of recesses on the molded plastic end cap.

* * * * *